US006822836B2

(12) United States Patent
Gill

(10) Patent No.: US 6,822,836 B2
(45) Date of Patent: Nov. 23, 2004

(54) ANTI-PARALLEL COUPLED FREE LAYER FOR A GMR SENSOR FOR A MAGNETIC HEAD

(75) Inventor: Hardayal Singh Gill, Palo Alto, CA (US)

(73) Assignee: International Business Machines Corporation, Armonk, NY (US)

(*) Notice: Subject to any disclaimer, the term of this patent is extended or adjusted under 35 U.S.C. 154(b) by 99 days.

(21) Appl. No.: 10/051,859

(22) Filed: Jan. 15, 2002

(65) Prior Publication Data

US 2003/0133233 A1 Jul. 17, 2003

(51) Int. Cl.[7] .................................................. G11B 5/39
(52) U.S. Cl. ................................................... 360/324.12
(58) Field of Search ............................ 360/324.1, 324, 360/324.12, 324.2, 327.3, 327.32

(56) References Cited

U.S. PATENT DOCUMENTS

| 5,461,527 | A | * | 10/1995 | Akiyama et al. ...... 360/327.32 |
| 5,969,896 | A | | 10/1999 | Nakamoto et al. ............. 360/66 |
| 6,090,498 | A | | 7/2000 | Omata et al. ................. 428/692 |
| 6,112,150 | A | | 9/2000 | Gill ........................ 360/324.11 |
| 6,118,624 | A | | 9/2000 | Fukuzawa et al. | |
| 6,146,776 | A | | 11/2000 | Fukuzawa et al. .......... 428/692 |
| 6,266,218 | B1 | * | 7/2001 | Carey et al. ............ 360/324.12 |
| 6,477,020 | B1 | * | 11/2002 | Aoshima et al. ........ 360/327.31 |
| 6,574,080 | B1 | * | 6/2003 | Sakaguci et al. ....... 360/327.32 |
| 6,633,466 | B2 | * | 10/2003 | Sakaguci et al. ....... 360/327.31 |
| 2002/0024781 | A1 | * | 2/2002 | Ooshima et al. ........ 360/324.12 |

FOREIGN PATENT DOCUMENTS

JP          2001-176028      *  6/2003

* cited by examiner

Primary Examiner—David L. Ometz
(74) Attorney, Agent, or Firm—Robert O. Guillot; Intellectual Property Law Offices

(57) ABSTRACT

A magnetic head including a GMR read head structure in which the outer end portions of the free magnetic layer are magnetically stabilized. The stabilization is achieved by the fabrication of thin film layers on top of the outer end portions that have an anti-parallel coupled magnetic field structure. A seed layer having a BCC crystal structure is deposited before a first magnetic field layer to increase coercivity of the anti-parallel coupled structure. The thickness of the layers is selected to produce a high coercivity structure having a net magnetization in the same direction as the magnetic field of the free magnetic layer. The anti-parallel coupled structure preferably includes a CoFeCr seed layer, a CoPtCr first magnetic layer, an Ru nonmagnetic layer and a CoPtCr second magnetic layer. An enhanced structure includes two CoFe layers formed below and above the Ru layer.

32 Claims, 2 Drawing Sheets

ANTI-PARALLEL COUPLED FREE LAYER FOR A GMR SENSOR FOR A MAGNETIC HEAD

BACKGROUND OF THE INVENTION

1. Field of the Invention

The present invention relates generally to read head portions of magnetic heads for hard disk drives, and more particularly to read heads having anti-parallel coupled magnetic structures at end regions of the free layer.

2. Description of the Prior Art

One well known way to increase the performance of hard disk drives is to increase the areal data storage density of the magnetic hard disk. This can be accomplished by reducing the written data track width, such that more tracks per inch can be written on the disk. To read data from a disk with a reduced track width, it is also necessary to develop sufficiently narrow read head components, such that unwanted magnetic field interference from adjacent data tracks is substantially eliminated.

The standard prior art read head elements include a plurality of thin film layers that are deposited and fabricated to produce a GMR read head, as is known to those skilled in the art. Significantly, where the width of the thin film layers that comprise the GMR read head is reduced below certain values, the magnetic properties of the layers are substantially compromised. To overcome this problem, GMR read heads have been developed in which the thin film layers have an ample width and the electrical leads are overlaid on top of portions of the thin film layers. This lead overlaid configuration has the effect of creating an active read head region having a width that is less than the entire width of the deposited layers, such that the magnetic properties of the thin film layers can be preserved. Thus, in the lead overlaid GMR read heads of the prior art, active magnetic layer portions exist between the electrical leads and passive magnetic layer portions exist in the end portions of the layers beneath the electrical leads.

A problem that has been recognized with regard to such prior art lead overlaid read heads is that the passive region of the magnetic layers of the read head, and particularly the free magnetic layer, is not entirely passive. That is, external magnetic fields, such as from adjacent data tracks, create magnetic field fluctuation and noise within the passive regions of the free magnetic layer beneath the electrical leads. Thus, noise and side reading effects continue to be a problem with lead overlaid GMR read heads. The present invention seeks to solve this problem by pinning the magnetization of the free magnetic layer by adding an anti-parallel coupled layer structure on top of the end regions of the free layers to provide magnetostatic bias to the end regions, thus stabilizing the end regions as well as the central free layer region, and reducing noise and side reading effects.

SUMMARY OF THE INVENTION

The present invention is an improved magnetic head for a hard disk drive including a read head structure in which the magnetic fields of the end regions of the free magnetic layer are stabilized by a magnetostatic bias provided by an anti-parallel coupled layer structure that is fabricated on top of the end regions. In one embodiment of the present invention the anti-parallel coupled layer structure includes thin film layers comprised of materials such as CoPtCr, Ru and CoPtCr that are deposited on top of the end regions of the free layer. The thickness of the CoPtCr layers is particularly selected to create a magnetostatic bias that acts to pin the magnetic fields in the end regions of the free layer. The operational characteristics of the read head are improved because the end regions of the free layer are magnetically stabilized and thus not affected by side reading magnetic fields from adjacent data tracks. Noise and side reading effects are thereby reduced and the performance of the read head is thereby improved. In an alternative embodiment of the present invention layers of CoFe are deposited on each side of the Ru layer to improve the anti-parallel coupling of the CoPtCr layers. This further stabilizes the magnetostatic field of the layers, such that the magnetic fields within the end regions of the free layer are thereby rendered less sensitive to side reading and noise, and an improved magnetic head is thereby produced.

It is an advantage of the magnetic head of the present invention that a read head structure has been developed with reduced noise and side reading problems.

It is another advantage of the magnetic head of the present invention that a read head structure has been developed having stabilized magnetic fields in the end regions of the free magnetic layer thereof.

It is an advantage of the hard disk drive of the present invention that it includes a magnetic head having a reduced read track width with reduced side reading and noise.

It is another advantage of the hard disk drive of the present invention that it includes a magnetic head having a read head structure having stabilized magnetic fields in the end regions of the free magnetic layer thereof.

These and other features and advantages of the present invention will no doubt become apparent to those skilled in the art upon reading the following detailed description with makes reference to the several figures of the drawings.

IN THE DRAWINGS

DETAILED DESCRIPTION OF THE PREFERRED EMBODIMENTS

Figure 1:
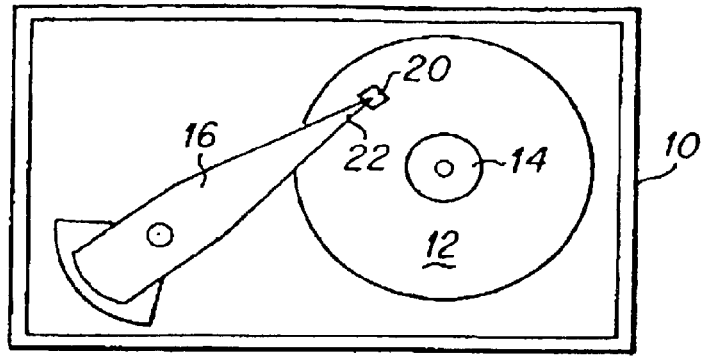
FIG. 1 is a top plan view depicting a hard disk drive having a magnetic head of the present invention.

FIG. 1 is a top plan view that depicts significant components of a hard disk drive which includes the magnetic head of the present invention. The hard disk drive 10 includes a magnetic media hard disk 12 that is rotatably mounted upon a motorized spindle 14. An actuator arm 16 is pivotally mounted within the hard disk drive 10 with a magnetic head 20 of the present invention disposed upon a distal end 22 of the actuator arm 16. A typical hard disk drive 10 may include a plurality of disks 12 that are rotatably mounted upon the spindle 14 and a plurality of actuator arms 16 having a magnetic head 20 mounted upon the distal end 22 of the actuator arms. As is well known to those skilled in the art, when the hard disk drive 10 is operated, the hard disk 12 rotates upon the spindle 14 and the magnetic head 20 acts as an air bearing slider that is adapted for flying above the surface of the rotating disk. The slider includes a substrate base upon which the various layers and structures that form the magnetic head are fabricated. Such heads are fabricated in large quantities upon a wafer substrate and subsequently sliced into discrete magnetic heads 20.

One way to increase the areal data storage density of a hard disk 12 is to narrow the track width of the data tracks written on the hard disk, such that more tracks per inch can be written on the disk. To write data in narrower tracks it is necessary to develop the write head components of magnetic heads with a narrower written track width. Correspondingly, it is also necessary to develop read head components of such magnetic heads 20 having narrowed active read head widths, such that side reading from adjacent data tracks is minimized. However, as is known in the prior art, and described in detail herebelow, performance limitations exist with regard to the width of the thin film layers that form the read head active components of GMR read heads. That is, the desirable magnetic properties of the thin film layers of the read head are adversely affected where the width of the read head layers is decreased below certain values. A prior art attempt to overcome this limitation is the electrical lead overlaid read head configuration that is depicted in FIG. 2, and next described.

Figure 2:
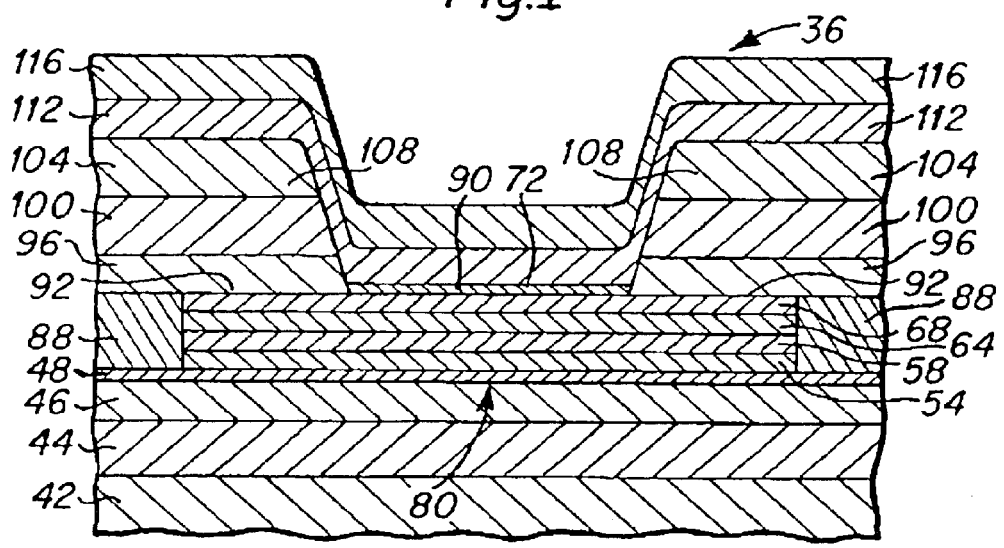
FIG. 2 is a side elevational view of a prior art GMR sensor of a magnetic head.

FIG. 2 is a side cross-sectional view of a prior art electrical lead overlaid read head 36 portion of a magnetic head 40. As depicted therein, the prior art lead overlaid read head 36 generally includes a substrate base 42 that constitutes the material from which the magnetic head is fabricated, such as aluminum titanium carbide. A first magnetic shield 44 is fabricated on the substrate, and an insulation layer 46, typically composed of aluminum oxide, is fabricated upon the magnetic shield 44. A seed layer 48 is deposited upon the insulation layer 46 and a series of thin film layers are sequentially deposited upon the seed layer 48 to form a GMR read head. A variety of thin film layers are known in the prior art to fabricate such GMR read heads, and, for the purposes of the present invention the layers generally include an antiferromagnetic layer 54, a pinned magnetic layer 58 that is deposited upon the antiferromagnetic layer 54, a spacer layer 64 that is deposited upon the pinned magnetic layer 58, a free magnetic layer 68 that is deposited upon the spacer layer 64 and a cap layer 72 that is deposited upon the free magnetic layer 68. Typically, the antiferromagnetic layer 54 may be composed of PtMn, the pinned magnetic layer 58 may be composed of CoFe, the spacer layer 64 may be composed of Cu, the free magnetic layer 68 may be composed of CoFe and the cap layer 72 may be composed of Ta.

Following the deposition of the GMR read head layers 54–72, a patterned etching process is conducted such that only central regions 80 of the layers 54–72 remain. Thereafter, hard bias elements 88 are deposited on each side of the central region 80. Following the deposition of the hard bias elements 88 a mask layer is fabricated on top of the central portion 90 of the cap layer 72, leaving outer portions of the cap layer exposed, and an etching process is next conducted which removes the outer portions of the cap layer to expose the upper surface of the outer portions 92 of the free layer 68. Thereafter, with the mask in place, a magnetically soft layer 96, composed of a material such as Permalloy is deposited, and thereafter an anti-ferromagnetic (AFM) material layer 100 is deposited. The soft layer 96 is deposited to have a thickness of approximately 100 Å, and the AFM layer 100 is typically deposited to a thickness of approximately 100 Å.

Electrical lead elements 104 are next fabricated on top of the AFM layer 100. As depicted in FIG. 2, inner ends 108 of the leads 104 are overlaid above the outer portions of the layers 54–68 of the central read head layer regions 80. The electrical leads 104 provide electrical current that passes through the various layers 54–68, and particularly the free layer 68, such that changes in the magnetic field orientation of the free layer 68 create changes in the resistance of the read head thin film structure which create detectable fluctuations in the read head bias voltage. The mask is next removed to expose the central portion 90 of the cap layer 72, and a second insulation layer 112 is fabricated on top of the electrical leads 104 and cap layer 72, followed by the fabrication of a second magnetic shield 116 and further components (not shown) that are well known to those skilled in the art for fabricating a complete magnetic head.

A significant feature of the prior art lead overlaid GMR read head 36 depicted in FIG. 2 is that the portion of the central layer region 80 which substantially defines the track reading width of the read head 36 is the central portion of the read head layer regions 80 that is disposed between the inner ends 108 of the electrical leads 104. That is, because the electrical current flows through the read head layers between the electrical leads 104, the active portion of the read head layers comprises the width between the inner ends 108 of the electrical leads 104. The outer portions 92 of the free magnetic layer 68 disposed beneath the overlaid inner ends 108 of the electrical leads 104 are somewhat passive in that electrical current between the electrical leads 104 does not fully pass through them. A significant problem with the prior art lead overlaid read head structure 36 is that the magnetization in the outer portions 92 of the free layer 68 beneath the electrical leads 104 can remain somewhat unstable and subject to unwanted magnetic field fluctuations. Additionally, side reading effects from adjacent data tracks as well as magnetic noise may still be created in the passive outer portions 92 of the free layer 68 beneath the electrical lead ends 108.

In an effort to stabilize the outer end portions 92 of the free magnetic layer 68, the soft magnetic layer 96 and AFM layer 100 are deposited. The AFM layer 100 acts to pin the magnetic field within the soft magnetic layer 96 which has the effect of pinning the magnetic field within end portions 92 of the free magnetic layer 68. While this approach has proved somewhat effective, it has a number of problems that limit its usefulness. This is because pinning by use of the AFM pinning layer 100 is very sensitive to the thickness of the soft layer 96. If the soft layer 96 is too thick the pinning is substantially reduced, because the pinning is inversely proportional to the thickness of the soft layer 96. So the thickness of the soft layer must be controlled as it is a significant parameter in the stabilization of the free layer 68. Additionally, the magnetic field of the AFM pinning layer 100 must be set at 90° to the magnetic field of the first AFM layer 54, and the temperature required to set the magnetic field of the AFM pinning layer 100 can disturb the magnetic field and degrade the pinning effect of the first AFM layer 54.

Figure 3:
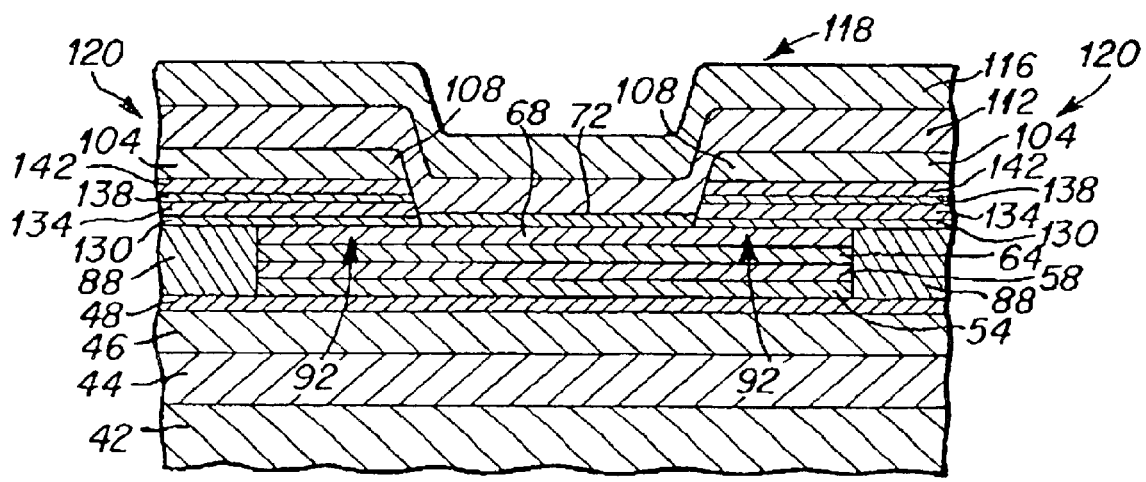
FIG. 3 is a side elevational view of a first preferred embodiment of a GMR sensor of the present invention.

As depicted in FIG. 3, a magnetic head 118 having a first preferred embodiment of the GMR sensor of the present invention includes a plurality of thin film layers that are fabricated upon the substrate. These layers may include a first magnetic shield layer 44 that is fabricated upon the substrate surface 42, an insulation layer 46, a seed layer 48, an AFM layer 54, a pinned magnetic field layer 58, a spacer layer 64, a free magnetic field layer 68 with outer end portions 92, a cap layer 72, two electrical leads 104, a second electrical insulation layer 112, and a second magnetic shield layer 116. Further layers as are known to those skilled in the art for completing the fabrication of a magnetic head are fabricated upon the second magnetic shield layer; however, a description of those layers is not necessary to provide a detailed description of the present invention.

The present invention provides improved performance of the GMR sensor by improving the stabilization of the magnetic field of the free layer 68. This is generally accomplished by fabricating a series of thin film layers upon the outer end portions 92 of the free layer 68 to create an anti-parallel coupled structure 120 having a net magnetostatic field. In the embodiment depicted in FIG. 3, the anti-parallel coupled structure 120 includes a seed layer 130, a first magnetic layer 134, a nonmagnetic spacer layer 138 and a second magnetic layer 142. As is described in greater detail next below, with the aid of an enlarged view of the anti-parallel structure 120 that is presented in FIG. 4, the magnetic fields of the first and second magnetic layers are fabricated to be anti-parallel with a net magnetostatic field in the direction of the magnetic field of the free magnetic layer 68. The anti-parallel coupled structure strongly stabilizes the magnetic field in the passive outer ends 92 of the free magnetic field layer 68, which reduces signal noise and side reading effects that can otherwise result from a poorly stabilized magnetic field of the free magnetic field layer.

Figure 4:
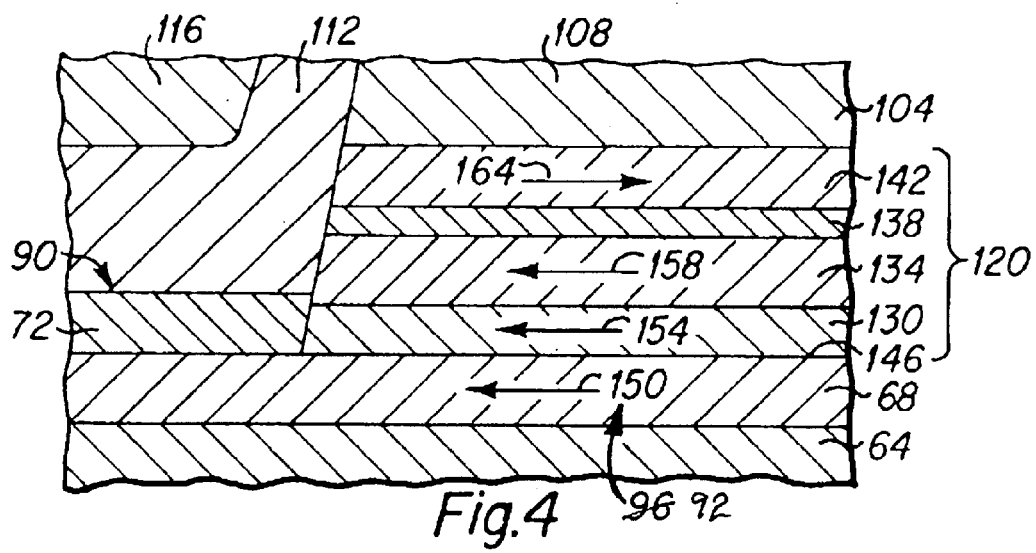
FIG. 4 is an enlarged view of the anti-parallel coupled layer structure depicted in FIG. 3.

In fabricating the magnetic head of FIGS. 3 and 4, the various layers of the GMR sensor, including the cap layer 72 that is disposed on top of the free layer 68 are first deposited. Thereafter, a patterned mask (not shown) is fabricated upon the cap layer 72, such that the central portion 90 of the cap layer 72 is protected while the outer end portions of the cap layer on top of the outer portions of the free layer are exposed. An etching step is next conducted to remove the outer portions of the cap layer, such that the surface 146 of the free layer 68 at its outer ends 92 is exposed while the central cap portion 72 remains. Thereafter, the seed layer 130 is deposited, such as by sputter deposition, upon the wafer surface, and particularly upon the exposed free layer surface 146 at its outer ends 92. The seed layer 130 is deposited to create desired crystalline structures in layers that are next deposited above the seed layer, and in the preferred embodiment, the seed layer 130 is a magnetic seed layer comprised of CoFeCr which is fabricated in a body centered cubic (BCC) crystal structure with a thickness of from approximately 10 Å to approximately 50 Å, and preferably approximately 30 Å. The CoFeCr composition preferably includes approximately 15 to 30 at. % Cr. As is depicted in FIG. 4, where the magnetic field of the free layer 68 is set in a particular direction, such as arrow 150 (to the left), the magnetic field of the seed layer 130 is fabricated in the same direction (to the left) see arrow 154. The first thin film magnetic layer 134 is next deposited upon the seed layer 130. The first magnetic layer 134 is preferably comprised of a material such as CoPtCr, and it is deposited to have a thickness of approximately 20 Å to 30 Å, and a magnetic field in the same direction (see arrow 158) as the free layer magnetic field layer 150 (towards the left). A preferred CoPtCr composition is approximately $Co_{80}Pt_{12}Cr_{8}$.

Thereafter, the thin film layer 138 of a nonmagnetic material such as ruthenium is deposited upon the first magnetic layer 134, and a preferred thickness for the nonmagnetic layer 138 is approximately 8 Å. Thereafter, the second magnetic layer 142 is deposited upon the nonmagnetic layer 138. The second magnetic layer is fabricated with a thickness that is selected according to a coercivity equation described below, and with a magnetic field that is anti-parallel (see arrow 164) to the magnetic field 158 of the first magnetic layer 134, and it is preferably comprised of the same material as the first magnetic layer, such as CoPtCr. The electrical leads 104 are thereafter fabricated upon the second magnetic layer 142 and the mask (not shown) is subsequently removed, and the insulation layer 112 and second magnetic shield layer 116 are thereafter fabricated upon the wafer surface, including the central cap portion 72 and electrical leads 104.

As is well known to those skilled in the art, the magnetic field in the seed layer 130, the first magnetic layer 134 and the second magnetic layer 142 is created by applying a strong magnetic field during the sputter deposition of the layers at room temperature, and elevated temperatures are not required to create the magnetic fields. Thus, the magnetization of the AFM layer 54 and the pinned layer 58 is not disturbed by the fabrication of the layers 130, 134 and 142 of the anti-parallel coupled structure 120.

It is therefore to be understood that the fabricated thin film structure, including the two anti-parallel magnetic layers 134 and 142 that have the nonmagnetic layer 138 disposed therebetween, create a stable anti-parallel coupled magnetic field structure 120 which pins and stabilizes the magnetic field 150 of the outer end portions 92 of the free layer 68. The pinning of the magnetic field in the end portions 92 of the free layer also stabilizes the central portion of the free layer such that it is constrained to stay in a single domain state. The BCC crystal structure of the seed layer 130 is significant in that it affects the crystal structure of the CoPtCr first magnetic layer 134, as well as the second magnetic layer 142, so as to improve the coercivity of the CoPtCr layers. The effective coercivity Hc of the anti-parallel coupled structure 120 is determined by the equation:

$$Hc(\text{effective}) = (Hc_1(t_1) + Hc_2(t_2))/(t_2 - t_1)$$

Where $Hc_1$ is the coercivity of the first magnetic layer 134, $t_1$ is the combined thickness of the first magnetic layer 134 plus the seed layer 130, $Hc_2$ is the coercivity of the second magnetic layer 142, and $t_2$ is the thickness of the second magnetic layer 142.

As can be understood from the equation above, the effective coercivity $H_c$ of the structure 120 is greatly increased where the value $(t_2 - t_1)$ is made small. Additionally, it is desirable that the total thickness of the seed layer 130 plus first magnetic layer 134 be greater than the thickness $t_2$ of the second magnetic layer 142, so that a net magnetization of the anti-parallel coupled system 120 is created that provides a strong magnetostatic bias that pins the magnetic field 150 within the passive end portions of the free magnetic layer 68.

In comparing the first embodiment of the present invention with the prior art GMR head depicted in FIG. 2, it can be seen that the total thickness of the anti-parallel coupled layer structure 120 of the present invention is approximately 60 Å to 140 Å, which is significantly less than the thickness (approximately at least 200 Å) of the prior art magnetic field stabilization structure that consists of the soft magnetic field layer 96 and the AFM layer 100. Because the anti-parallel coupled layer structure 120 of the present invention is thinner, it is easier to properly fabricate subsequent layers (particularly the second insulation layer 112) on top of the present invention, as opposed to the prior art device depicted in FIG. 2. That is, the greater thicknesses of the prior art structures fabricated along side the central read head structure result in a topography which is difficult for a thin second insulation layer to cover, resulting in the need to use a thicker second insulation layer in the prior art in order to prevent electrical shorts between the electrical leads 104 and the second magnetic shield 116 that is fabricated on top of the second insulation layer. Additionally, the pinning magnetic field of the prior art device depicted in FIG. 2 is generally not as strong as the anti-parallel coupled magnetic field of the present invention.

Furthermore, as indicated above, the prior art device of FIG. 2 utilizes two AFM layers 54 and 100, wherein the magnetic fields of the two AFM layers are set at 90 degrees to each other. The setting of the magnetic field within the AFM layers requires elevated temperatures, and the elevated temperature required to set the magnetic field in the second AFM layer 100 can result in the weakening of the magnetic field that was previously set in the first AFM layer 54. Additionally, the elevated temperatures required to set the field in the second AFM layer 100 can have adverse affects on the delicate, temperature sensitive layers within the GMR sensor stack. Therefore, the anti-parallel coupled structures 120 of the present invention provide an improved method for stabilizing the magnetic field of the free magnetic layer 68, in that high temperatures are not utilized to set the magnetic fields of the anti-parallel coupled structure 120.

Figure 5:
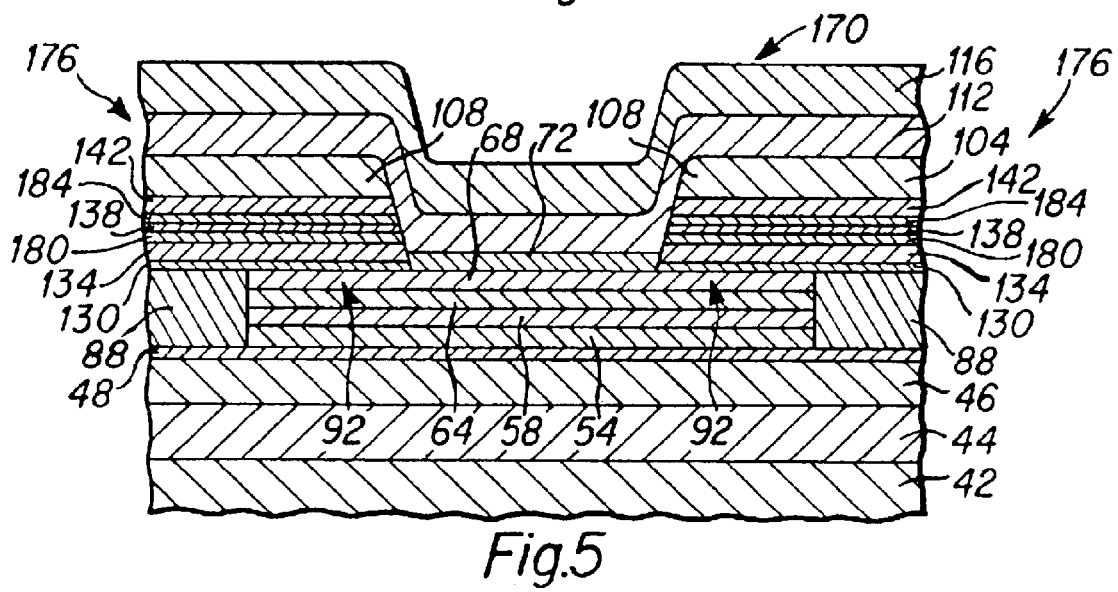
FIG. 5 is a side elevational view of a second preferred embodiment of a GMR sensor of the present invention.
Figure 6:
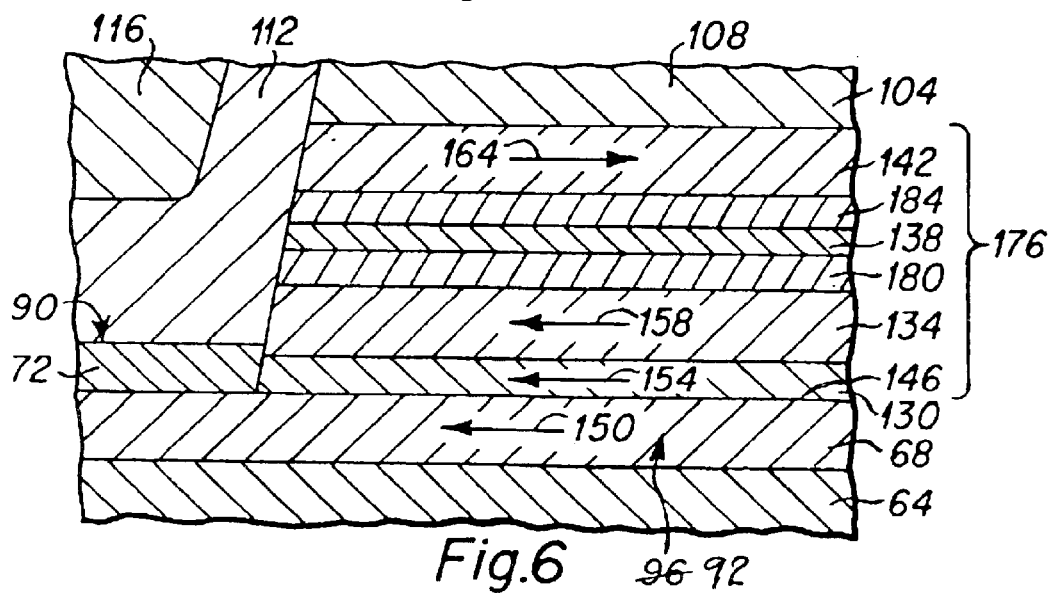
FIG. 6 is an enlarged view of the anti-parallel coupled layer structure depicted in FIG. 5.

A magnetic head 170 having an alternative and enhanced anti-parallel coupled free layer magnetic field stabilization structure 176 of the present invention is depicted in FIG. 5, and an enlarged view of the anti-parallel coupled structure 176 is depicted in FIG. 6. As depicted in FIGS. 5 and 6, and with reference to identically numbered structures of the device depicted in FIGS. 3 ad 4 and described hereabove, a seed layer 130 and a first magnetic layer 134 have been deposited upon the surface 146 of the outer portions 92 of the free layer 68. As described hereabove, the seed layer 130 preferably has a BCC crystal structure and is preferably comprised of CoFeCr, and the first magnetic layer 134 is preferably comprised of CoPtCr. Thereafter, a thin film layer 180 comprised of CoFe is deposited upon the first magnetic layer 134 to a thickness of approximately 5 Å to approximately 20 Å. A nonmagnetic thin film layer 138 preferably comprised of Ru with a thickness of approximately 8 Å is next deposited, followed by a second CoFe layer 184 having a thickness of approximately 5 Å to approximately 20 Å. The second magnetic layer 142, which is preferably comprised of CoPtCr, is then deposited upon the second CoFe layer 184. The preferred CoFe composition is approximately $Co_{50}Fe_{50}$.

As was described above, with regard to the first preferred embodiment depicted in FIGS. 3 and 4, where the magnetic field of the free layer 68 is towards the left (arrow 150) the magnetic fields of the seed layer 130 and first magnetic layer 134 are also towards the left (see arrows 154 and 158) and the magnetic field of the second magnetic layer 142 is anti-parallel, or towards the right (see arrow 164). A comparison of the device depicted in FIGS. 5 and 6 with that depicted in FIGS. 3 and 4 reveals the difference that the nonmagnetic Ru layer 138 is now disposed between two CoFe layers 180 and 184. It has been found that the additional two CoFe layers 180 and 184 act to strengthen the anti-parallel coupling of the two magnetic layers 134 and 142 to effectively increase the coercivity of the anti-parallel coupled structure 176. The device depicted in FIG. 5 has the same general advantages over the prior art as the device depicted in FIG. 3. However, it has increased coercivity relative to the device depicted in FIG. 3, and therefore produces a more stable anti-parallel coupled magnetic field, that leads to the increased stabilization of the free layer 68.

While the invention has been shown and described with reference to certain preferred embodiments, it will be understood by those skilled in the art that various alterations in form and detail may be made therein without departing from the true spirit and scope of the invention. Particularly, while the preferred embodiments are shown and described in association with a lead overlaid read head structure, the present invention is not to be so limited, and it is generally effective in eliminating noise and side reading effects from outward end portions of the free magnetic layer of any GMR magnetic head structure. It is therefore intended that the following claims cover all such alterations and modifications in form and detail that nevertheless include the true spirit and scope of the invention.

What I claim is:

1. A magnetic head including a read head structure, comprising:
    a free magnetic layer, including a central region and outwardly disposed end regions thereof; said free magnetic layer having a planar upper surface thereof that extends across said central region and across each of said end regions;
    an anti-parallel coupled magnetic layer structure being disposed directly upon said upper surface of said free magnetic layer at said end regions thereof, said anti-parallel coupled magnetic layer structure including at least two anti-parallel coupled magnetic layers; and
    wherein said anti-parallel coupled magnetic layer structure includes a magnetic seed layer that is disposed directly upon said upper surface of said free magnetic layer at said end regions of said free magnetic layer, and a first one of said at least two magnetic layers is disposed directly upon said seed layer.

2. A magnetic head as described in claim 1 wherein a thin film nonmagnetic layer is disposed between said at least two said magnetic layers.

3. A magnetic head as described in claim 1 wherein said seed layer is formed with a BCC crystal structure.

4. A magnetic head as described in claim 3, wherein said seed layer is comprised of CoFeCr, and has a thickness of from approximately 10 Å to approximately 50 Å.

5. A magnetic head as described in claim 1 wherein a thin film nonmagnetic layer is disposed on top of said first magnetic layer, and a second one of said at least two magnetic layers is disposed on top of said nonmagnetic layer.

6. A magnetic head as described in claim 5 wherein said first and second magnetic layers are comprised of CoPtCr, and said first magnetic layer has a thickness that is from approximately 20 Å to approximately 30 Å and said second magnetic layer has a thickness of from approximately 30 Å to approximately 80 Å.

7. A magnetic head as described in claim 6 wherein said non-magnetic layer is comprised of Ru and has a thickness that is approximately 8 Å.

8. A magnetic head as described in claim 6 wherein said seed layer has a thickness, and the total thickness of said seed layer plus said first magnetic layer is greater than the thickness of said second magnetic layer.

9. A magnetic head as described in claim 5, wherein a third thin film magnetic layer is disposed between said first magnetic layer and said nonmagnetic layer, and a fourth magnetic layer is disposed between said nonmagnetic layer and a second magnetic layer.

10. A magnetic head as described in claim 9, wherein said third magnetic layer and said fourth magnetic layer are comprised of CoFe.

11. A magnetic head as described in claim 1, wherein said anti-parallel coupled magnetic layers have a net magnetostatic field in the same direction as a magnetic field of said free layer.

12. A magnetic head including a GMR sensor, comprising:
   a plurality of thin film layers forming a GMR sensor, wherein at least one of said layers is a free magnetic layer, said free magnetic layer including a planar central portion and two outwardly disposed planar end regions thereof, said planar end regions being coplanar with said planar central portion of said free magnetic layer;
   a magnetic seed layer being disposed upon said planar end regions;
   a first magnetic layer being disposed upon said seed layer;
   a nonmagnetic layer being disposed upon said first magnetic layer;
   a second magnetic layer being disposed upon said nonmagnetic layer;
   wherein said first magnetic layer is formed with a magnetic field and said second magnetic layer is formed with a magnetic field, and wherein the magnetic fields of said first magnetic layer and said magnetic layer are anti-parallel coupled.

13. A magnetic head as described in claim 12, wherein said free magnetic layer is formed with a magnetic field in a first direction and said anti-parallel coupled magnetic field of said first magnetic layer and said second magnetic layer is formed with a magnetostatic bias in the same direction as the magnetic field of said free magnetic layer.

14. A magnetic head as described in claim 12 wherein said seed layer is formed with a BCC crystal structure.

15. A magnetic head as described in claim 14 wherein said seed layer is comprised of CoFeCr, and said first magnetic layer is comprised of CoPtCr, and said nonmagnetic layer is comprised of Ru, and said second magnetic layer is comprised of CoPtCr.

16. A magnetic head as described in claim 15 wherein a layer being comprised of CoFe is disposed between said first magnetic layer and said nonmagnetic layer, and a second layer comprised of CoFe is disposed between said nonmagnetic layer and said second magnetic layer.

17. A hard disk drive including a magnetic head having a read head structure, comprising:
   a free magnetic layer, including a central region and outwardly disposed end regions thereof; said free magnetic layer having a planar upper surface thereof that extends across said central region and across each of said end regions;
   an anti-parallel coupled magnetic layer structure being disposed directly upon said upper surface of said free magnetic layer at said end regions thereof, said anti-parallel coupled magnetic layer structure including at least two anti-parallel coupled magnetic layers; and
   wherein said antiparallel coupled magnetic layer structure includes a magnetic seed layer that is disposed directly upon said upper surface of said free magnetic layer at said end regions of said free magnetic layer, and said first one of said at least two magnetic layers is disposed directly upon said seed layer.

18. A hard disk drive as described in claim 17 wherein a thin film nonmagnetic layer is disposed between said at least two magnetic layers.

19. A hard disk drive as described in claim 17 wherein said seed layer is formed with a BCC crystal structure.

20. A hard disk drive as described in claim 19, wherein said seed layer is comprised of CoFeCr, and has a thickness of from approximately 10 Å to approximately 50 Å.

21. A hard disk drive as described in claim 17 wherein a thin film non-magnetic layer is disposed on top of said first magnetic layer, and a second one of said at least two magnetic layers is disposed on top of said non-magnetic layer.

22. A hard disk drive as described in claim 21 wherein said first and second magnetic layers are comprised of CoPtCr, and wherein said first magnetic layer has a thickness that is from approximately 20 Å to approximately 30 Å and said second magnetic layer has a thickness that is from approximately 30 Å to approximately 80 Å.

23. A hard disk drive as described in claim 22 wherein said non-magnetic layer is comprised of Ru and has a thickness that is approximately 8 Å.

24. A hard disk drive as described in claim 22 wherein said seed layer has a thickness, and the total thickness of said seed layer plus said first magnetic layer is greater than the thickness of said second magnetic layer.

25. A hard disk drive as described in claim 21, wherein a third thin film magnetic layer is disposed between said first magnetic layer and said non-magnetic layer, and a fourth magnetic layer is disposed between said non-magnetic layer and a second magnetic layer.

26. A hard disk drive as described in claim 25, wherein said third magnetic layer and said fourth magnetic layer are comprised of CoFe.

27. A hard disk drive as described in claim 17, wherein said anti-parallel coupled magnetic layers have a net magnetostatic field in the same direction as a magnetic field of said free layer.

28. A method for fabricating a read head structure of a magnetic head, comprising the steps of:
   fabricating a plurality of thin film layers to create a GMR sensor, said layers including a free magnetic layer having a central region and outwardly disposed end regions; said free magnetic layer having a planar upper surface thereof that extends across said central region and across each of said end regions;
   fabricating an anti-parallel coupled magnetic layer structure directly upon said upper surface of said free magnetic layer at said end regions thereof, said anti-parallel coupled magnetic layer structure including at least two magnetic layers that are anti-parallel coupled;
   fabricating a seed layer comprised of a magnetic material directly upon said end portions of said free magnetic layer;
   fabricating a first said magnetic layer directly upon said seed layer;
   fabricating a nonmagnetic layer above said first magnetic layer; and
   fabricating a second said magnetic layer above said nonmagnetic layer.

29. A method for fabricating a read head structure as described in claim 28, wherein a net magnetostatic field is produced by said anti-parallel coupled magnetic layers, said net magnetostatic field being formed in the same direction as a magnetic field of said free magnetic layer.

30. A method for fabricating a read head structure as described in claim 28 wherein said seed layer is comprised of CoFeCr, said first magnetic layer is comprised of CoPtCr, said nonmagnetic layer is comprised of Ru and said second magnetic layer is comprised of CoPtCr.

31. A method for fabricating a read head structure as described in claim 30 wherein said seed layer is fabricated with a BCC crystal structure.

32. A method for fabricating a read head structure as described in claim 31 including the further steps of fabricating a layer comprised of CoFe between said first magnetic layer and said nonmagnetic layer, and fabricating a second layer comprised of CoFe between said nonmagnetic layer and said second magnetic layer.

* * * * *